United States Patent
Bertothy

(10) Patent No.: US 6,575,651 B1
(45) Date of Patent: Jun. 10, 2003

(54) FOOD BASTING DEVICE

(75) Inventor: Lori R. Bertothy, Phoenix, AZ (US)

(73) Assignee: Beerman BBQ Company, Inc., Phoenix, AZ (US)

( * ) Notice: Subject to any disclaimer, the term of this patent is extended or adjusted under 35 U.S.C. 154(b) by 0 days.

(21) Appl. No.: 10/078,768

(22) Filed: Feb. 19, 2002

(51) Int. Cl.[7] .......................... A46B 11/04; A47L 13/22
(52) U.S. Cl. ....................... 401/281; 401/126; 401/129; 401/270; 401/280; 401/284
(58) Field of Search ................................. 401/124, 126, 401/129, 137, 139, 270, 275–277, 280–282, 284, 289, 290; D4/114; 222/553

(56) References Cited

U.S. PATENT DOCUMENTS

| 2,064,318 A | | 12/1936 | Platt | 15/133 |
|---|---|---|---|---|
| 2,669,740 A | * | 2/1954 | Main | 401/277 |
| D215,416 S | | 9/1969 | Posada | D9/2 |
| 4,066,367 A | * | 1/1978 | Sherosky | 401/270 |
| 4,848,946 A | * | 7/1989 | Goncalves | 401/124 |
| 5,186,559 A | * | 2/1993 | Fu | 401/276 |
| 5,547,303 A | * | 8/1996 | Pyrozyk | 401/270 |
| D376,479 S | | 12/1996 | Bresler | D4/114 |
| D385,704 S | | 11/1997 | Williams | D4/116 |
| D400,358 S | | 11/1998 | Zemel | D4/114 |
| 6,036,389 A | | 3/2000 | Zima | 401/137 |

FOREIGN PATENT DOCUMENTS

CH        620603 A5 * 12/1980 ................. 401/270

* cited by examiner

*Primary Examiner*—Steven O. Douglas
*Assistant Examiner*—Tuan Nguyen
(74) *Attorney, Agent, or Firm*—The Halvorson Law Firm

(57) ABSTRACT

Described is a device that is useful for basting food products in the cooking process. More specifically, the device is useful by providing variable fluid flow capabilities to food product basting appliances. The food basting device comprises two separate pieces, a cap piece and a brush piece that work in rotating relationship with each other to prove variable fluid flow through the device. The food basting device preferably works with fluid containers that do not have screw threads for a cap or lid, such as a beer or soda can.

2 Claims, 17 Drawing Sheets

FOOD BASTING DEVICE

FIELD OF THE INVENTION

The present invention relates to a device for dispensing liquids from a typical can, such as beer. More specifically, the present invention is a device with a can attachment piece and fluid dispensing piece that attaches to the can attachment piece and works in concert with the can attachment piece to provide adjustability of fluid flow through the device to targeted meat products.

BACKGROUND

When cooking meats and similar food items, a person often applies basting fluids such as marinades, sauces and the like, in order to enhance the flavor of the food items. Additionally, the addition of basting fluids has been found helpful in preventing the food items from excessive drying during the cooking process. During the application of the basting fluid, it is often desirable to evenly distribute the fluid of the exterior surface of the food product. This ensures an even coating of the basting fluid on the food surface.

Typically, when applying basting fluids, the fluid is applied from a container, such as a can, jar, cup, bowl or the like. Then, the basting fluid is distributed using a separate brush, spoon, fork, or other utensil. If it is desired that the utensil be repeatedly used, once it has been used, it must be prevented from contacting unclean surfaces.

One way of providing a device for basting food products with basting fluids has been to combine a container cap with a basting brush. See for examples, U.S. Pat. Nos. 6,036,389; 5,547,303; Des. 400,358; Des. 376,479; and Des. 215,416. While these patents disclose cap/brush combinations, none of them provide an easy convenient way to control the flow of the fluid as it travels through the cap/brush combination.

In U.S. Pat. No. 6,036,389 fluid flow controlled in a simple on/off manner by opening or closing a lid that covers the dispensing opening. Thus, the '389 device lacks the ability to provide variable fluid flow.

In U.S. Pat. No. 5,547,303 fluid flow is also controlled in a simple on/off manner by longitudinal displacement of the brush head (pulling the brush head outward opens the device for fluid flow and pushing the brush head inward closes the device for fluid flow).

Other patents in the prior allow continuous flow of fluids through their devices, without even simple on/off control.

Thus, there is a present need for a food product basting device that allows for variable flow control of fluids being dispensed therewith.

SUMMARY OF THE INVENTION

It is an object of the present invention to provide a food basting device that has variable fluid flow control.

It is another object of the present invention to provide a food basting device that has variable fluid flow control and further includes a brush element to evenly spread dispensed fluids onto food products.

It is yet another object of the present invention to provide a variable flow food basting device that comprises two separate pieces, the two separate pieces working together to provide the variable fluid flow capability.

It is still yet another object of the present invention to provide a variable flow food basting device works with containers that do not have screw threads for securing a cap.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
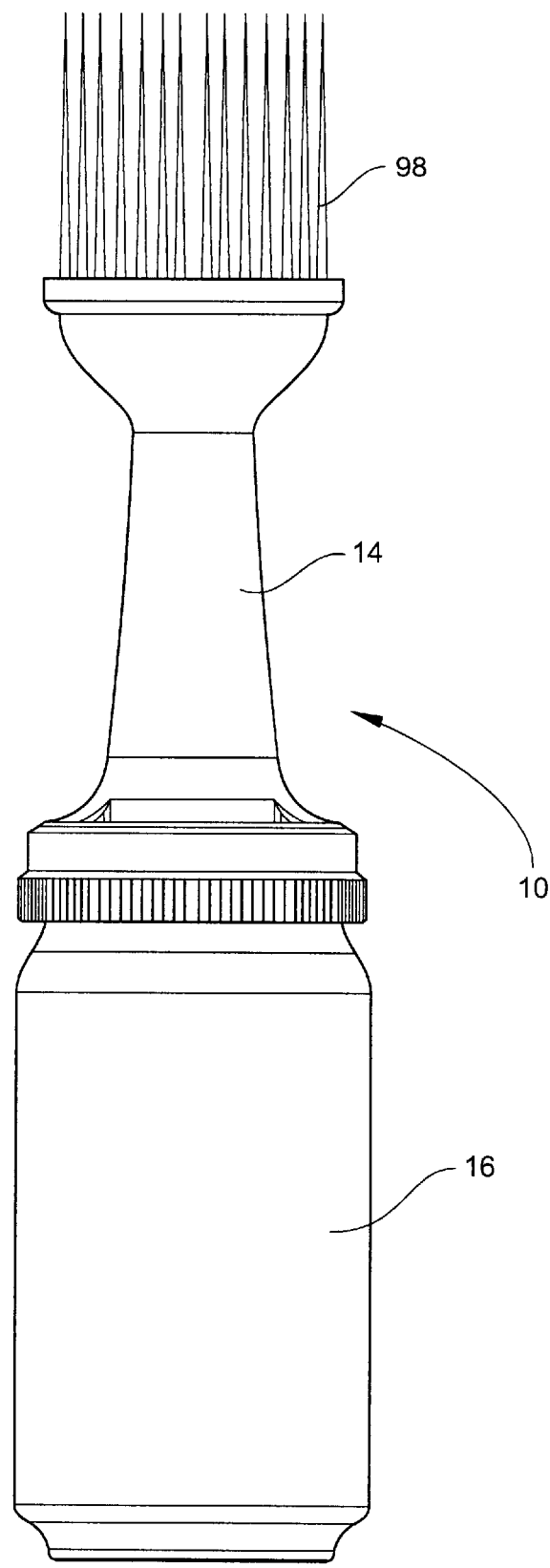
FIG. 1 is a front view of the present invention.
Figure 2:
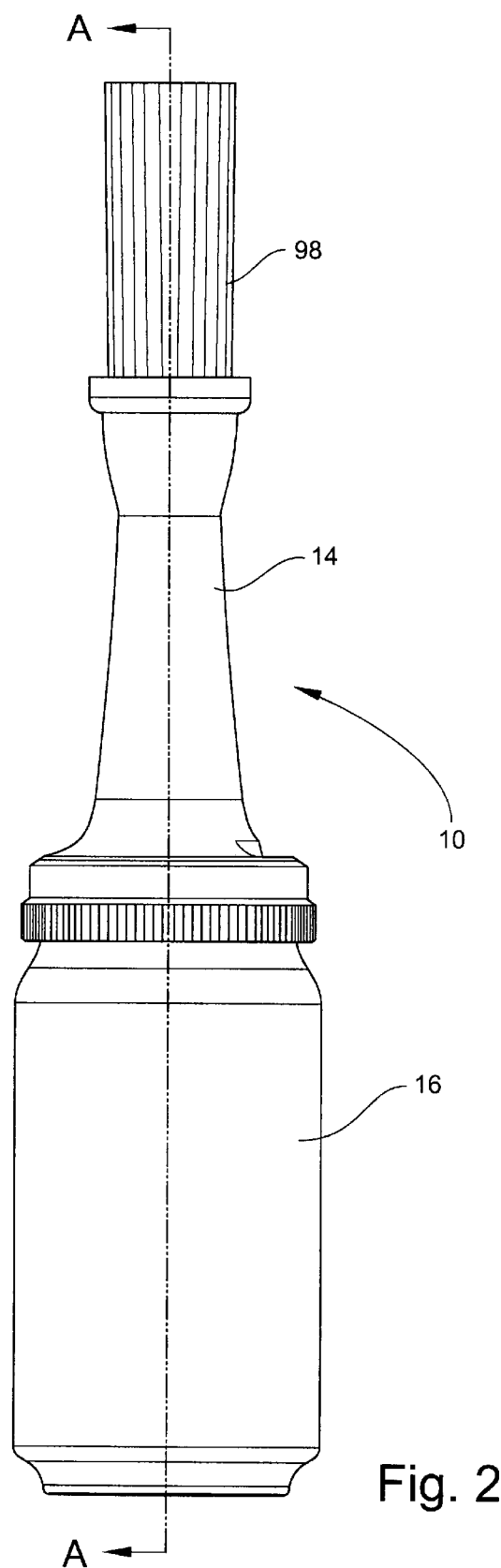
FIG. 2 is a side view of the present invention.
Figure 3:
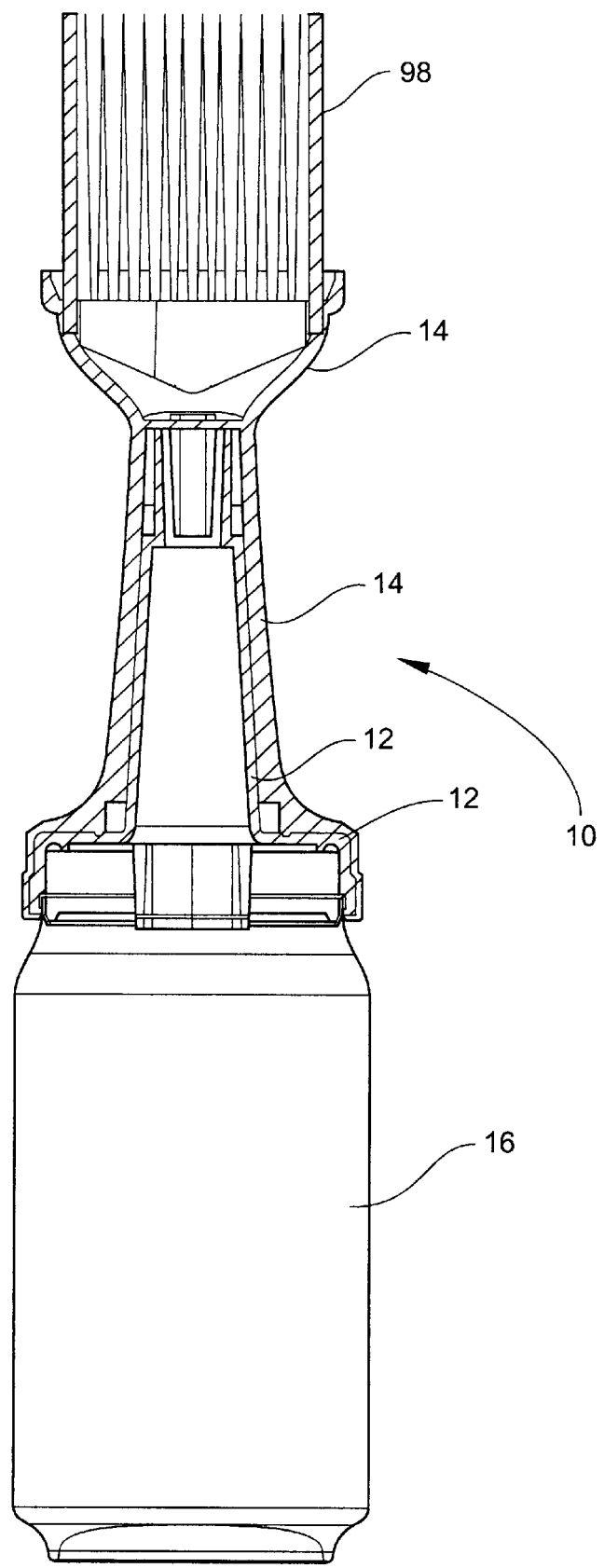
FIG. 3 is a sectional view of the present invention along line A—A in FIG. 2.
Figure 4:
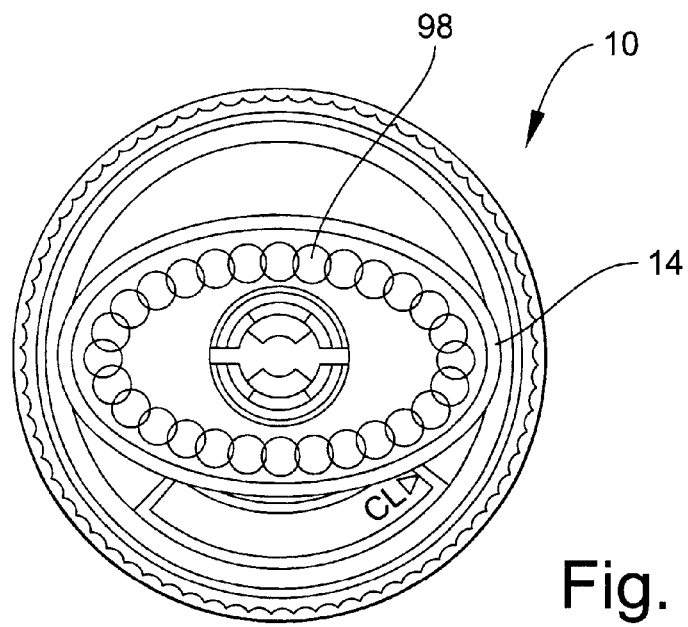
FIG. 4 is a top view of the present invention.
Figure 5:
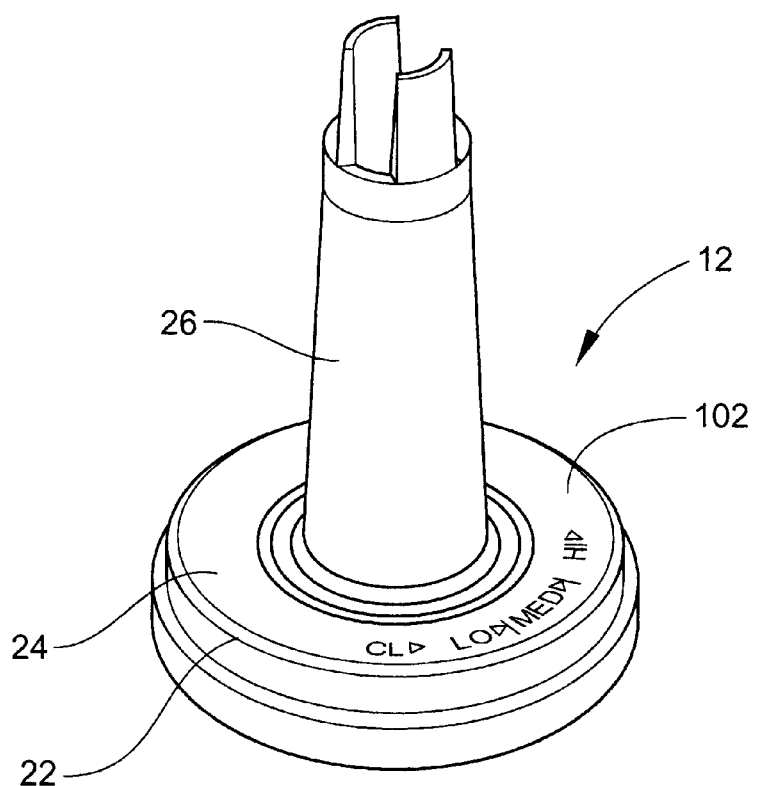
FIG. 5 is a perspective view of the cap piece according to the present invention.
Figure 6:
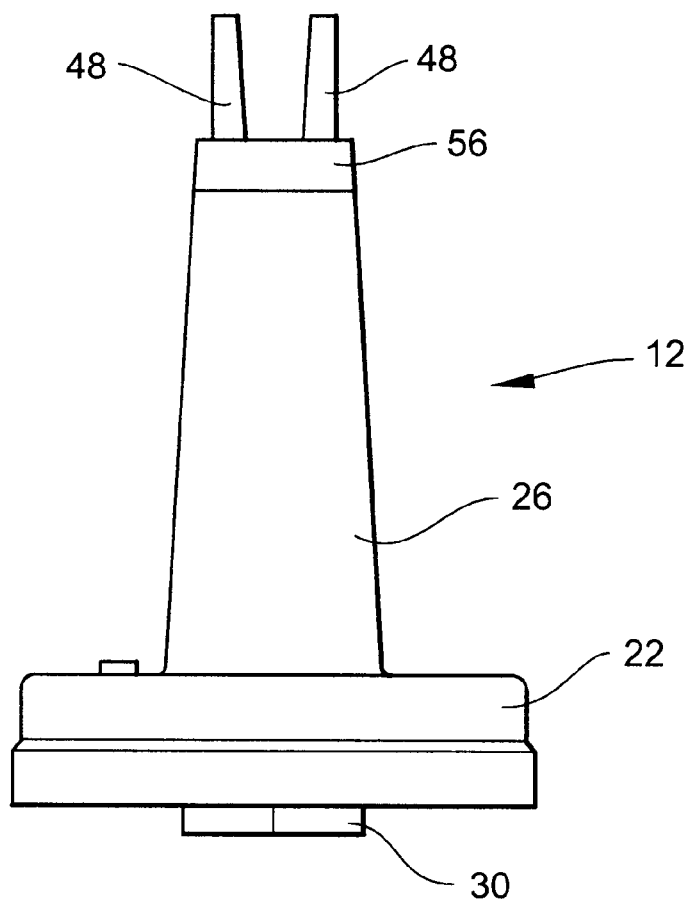
FIG. 6 is a rear view of the cap piece according to the present invention.
Figure 7:
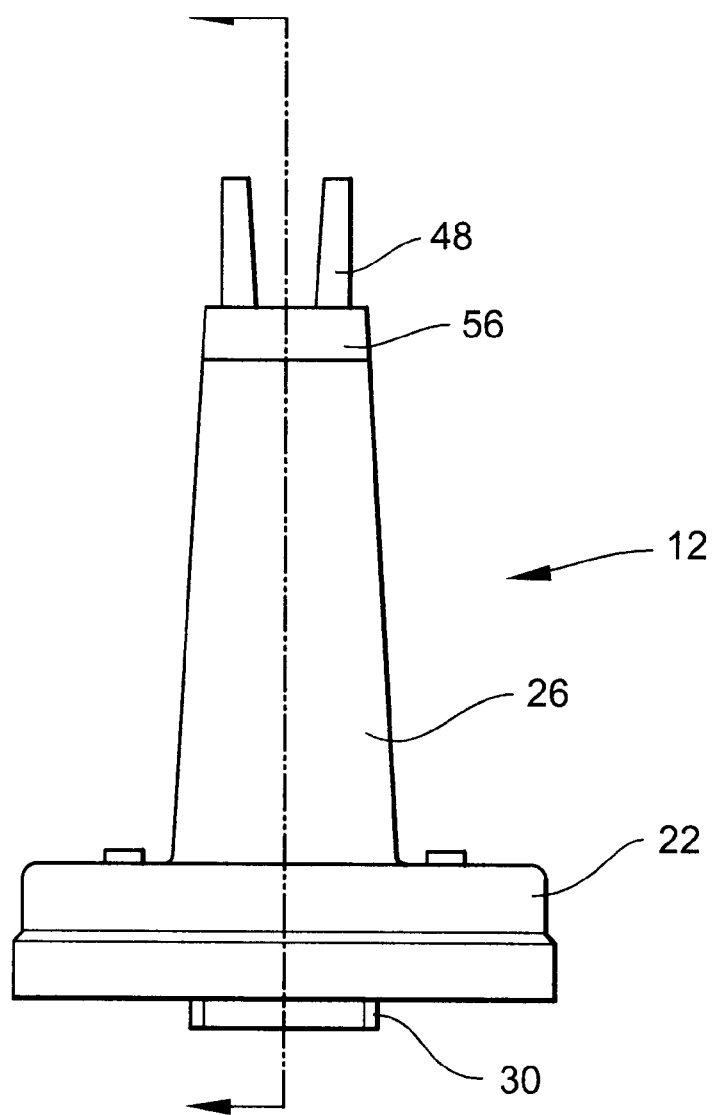
FIG. 7 is a side view of the cap piece according to the present invention.
Figure 8:
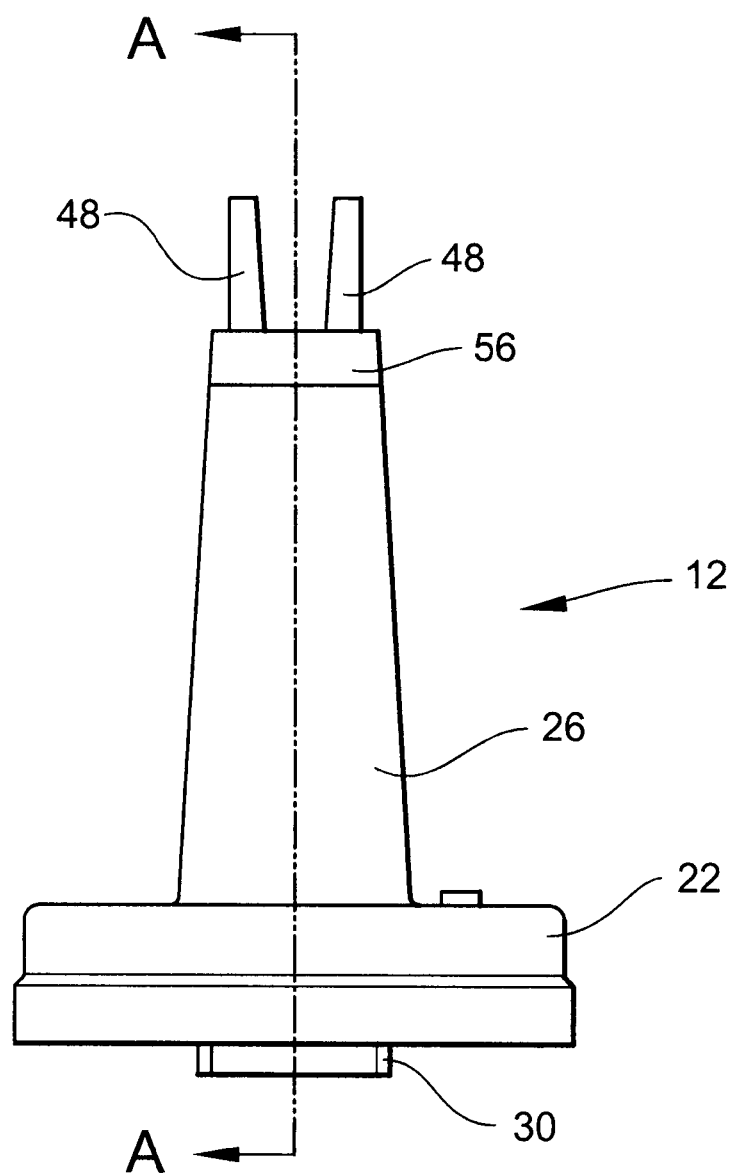
FIG. 8 is a front view of the cap piece according to the present invention.

The present invention is a device that is useful for basting food products in the cooking process. More specifically, the present invention is a device that is useful by providing variable fluid flow capabilities to food product basting appliances.

Referring now to FIGS. 1–5, the present invention is a food basting device and is generally represented as 10. The food basting device 10 comprises two separate pieces, a cap piece 12 and a brush piece 14. The food basting device 10 according to the present invention preferably works with fluid containers that do not have screw threads for a cap or lid, such as a beer or soda can.

The cap piece 12 of the present invention is designed to work in combination with a fluid container 16. The preferred form of fluid container 16 would be one without screw threading for caps and lids. The most preferred form is a beverage type container, such as a beer or soda type container.

Referring to FIGS. 6–13, the cap piece 12 comprises a cylindrical portion 22 with a circular disk portion 24 that forms a top for the cylindrical portion 22. Centrally located in the circular disk portion 24 is a hollow fluid flow conduit 26. The hollow fluid flow conduit 26 allows a fluid that is contained in the fluid container 16 to flow through the cap piece 12 when the cap piece 12 is attached to the fluid container 16.

Figure 10:
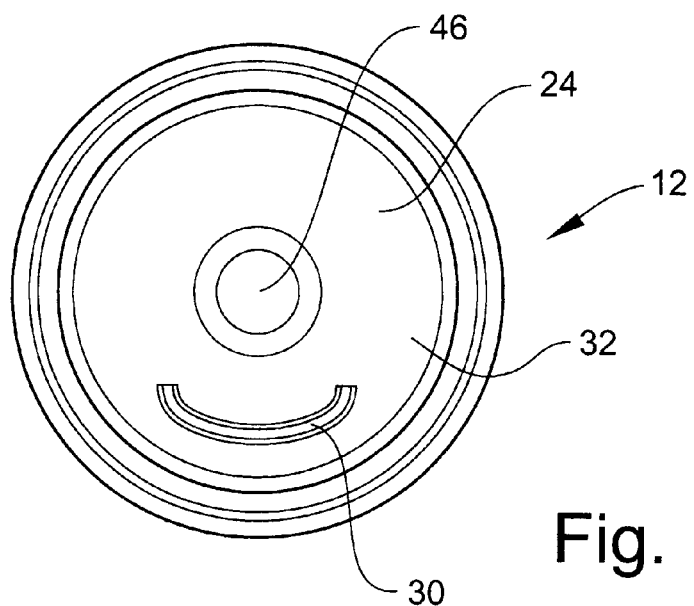
FIG. 10 is a bottom view of the cap piece according to the present invention.
Figure 11:
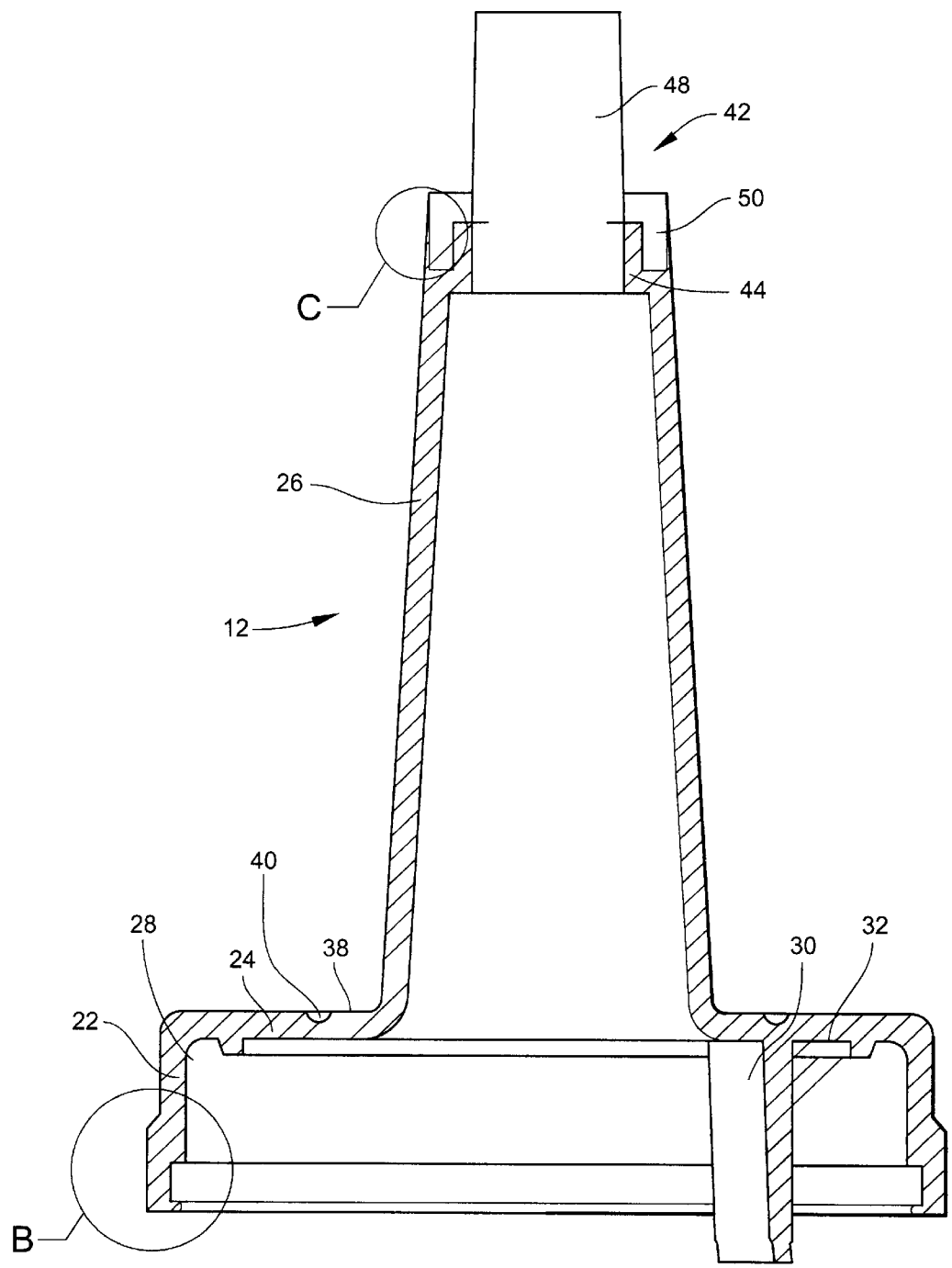
FIG. 11 is a sectional view of the cap piece according to the present invention along line A—A in FIG. 8.

Referring especially to FIGS. 10 and 11, a position retention tab 30 projects downwardly from a bottom surface 32 of the circular disk portion 24. This position retention tab 30 projects sufficiently such that when the cap piece 12 is attached to a fluid container 16, the position retention tab 30 extends into an opening in the fluid container 16, thereby preventing unwanted rotation about the longitudinal axis of the cap piece 12. In a preferred embodiment, the position retention tab 30 is arcuate in shape and located immediately adjacent the fluid flow conduit 26.

Figure 12:
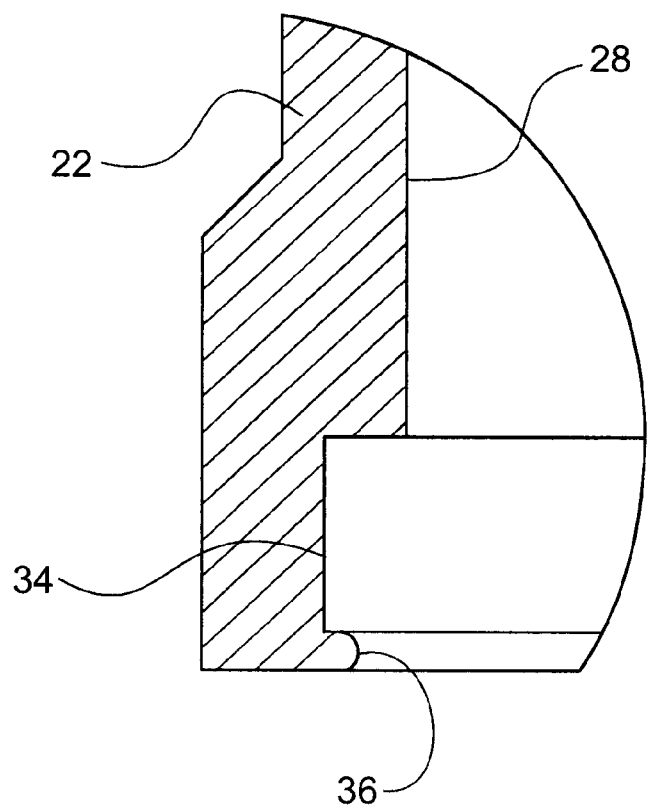
FIG. 12 is a detailed view of outlined section B in FIG. 11.

Referring especially to FIGS. 11 and 12, the interior of the cylindrical portion 22 further comprises an interior wall 28 that runs around the interior circumference of the cylindrical portion 22. Located at a distal end of the cylindrical portion 22 is a fluid container retention cut-out 34. The fluid container retention cut-out 34 includes an inwardly directed retention ring 36. It can be seen from FIG. 12, which is a detailed view of outlined section B in FIG. 11, that the diameter of the fluid container retention cut-out 34 is greater than the diameter of the interior wall 28. Additionally, the diameter of the retention ring 36 is less than the diameter of the fluid container retention cut-out 34. While the diameter of the retention ring 36 can be less than, or equal to, the diameter of the interior wall 28, in a preferred embodiment, the diameter of the retention ring 36 is slightly greater than the diameter of the interior wall 28. The retention ring 36 retains the fluid container 16 when it is snapped over top rim of the fluid container 16. Because there are two different interior diameters, it is preferred that these diameters be selected to accommodate two different fluid container sizes. Thus, the present invention is not limited to use with a single sized container.

Referring especially to FIGS. 11 and 10, located on a top surface 38 of the circular disk portion 24 is a circular channel 40. The circular channel 40 is preferably co-axial with the fluid flow conduit 26.

Figure 9:
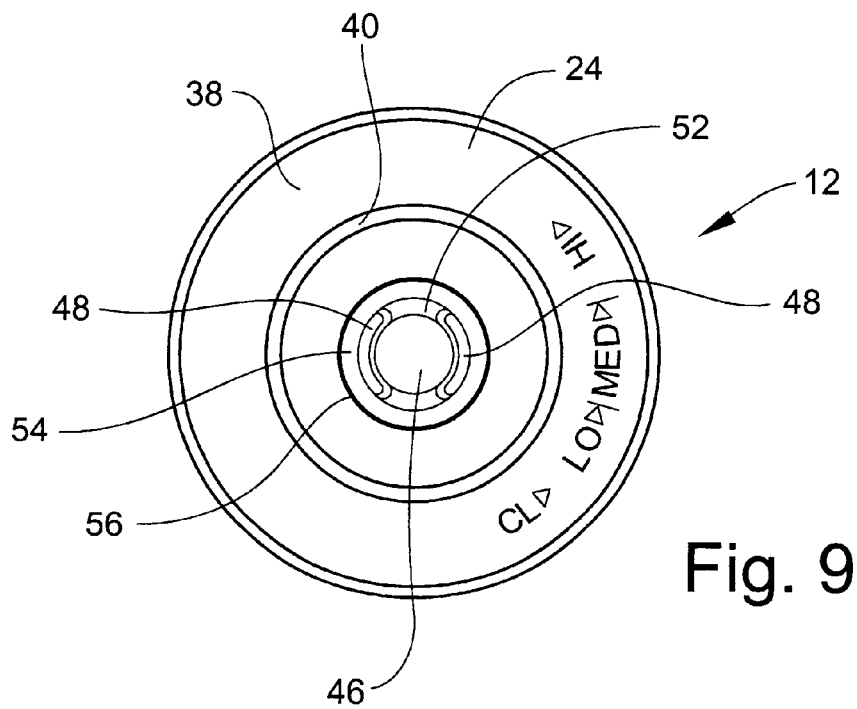
FIG. 9 is a top view of the cap piece according to the present invention.
Figure 13:
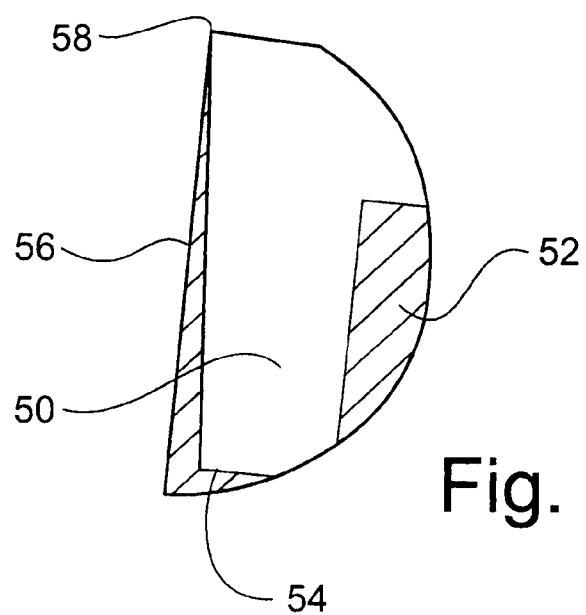
FIG. 13 is a detailed view of outlined section C in FIG. 11.
Figure 14:
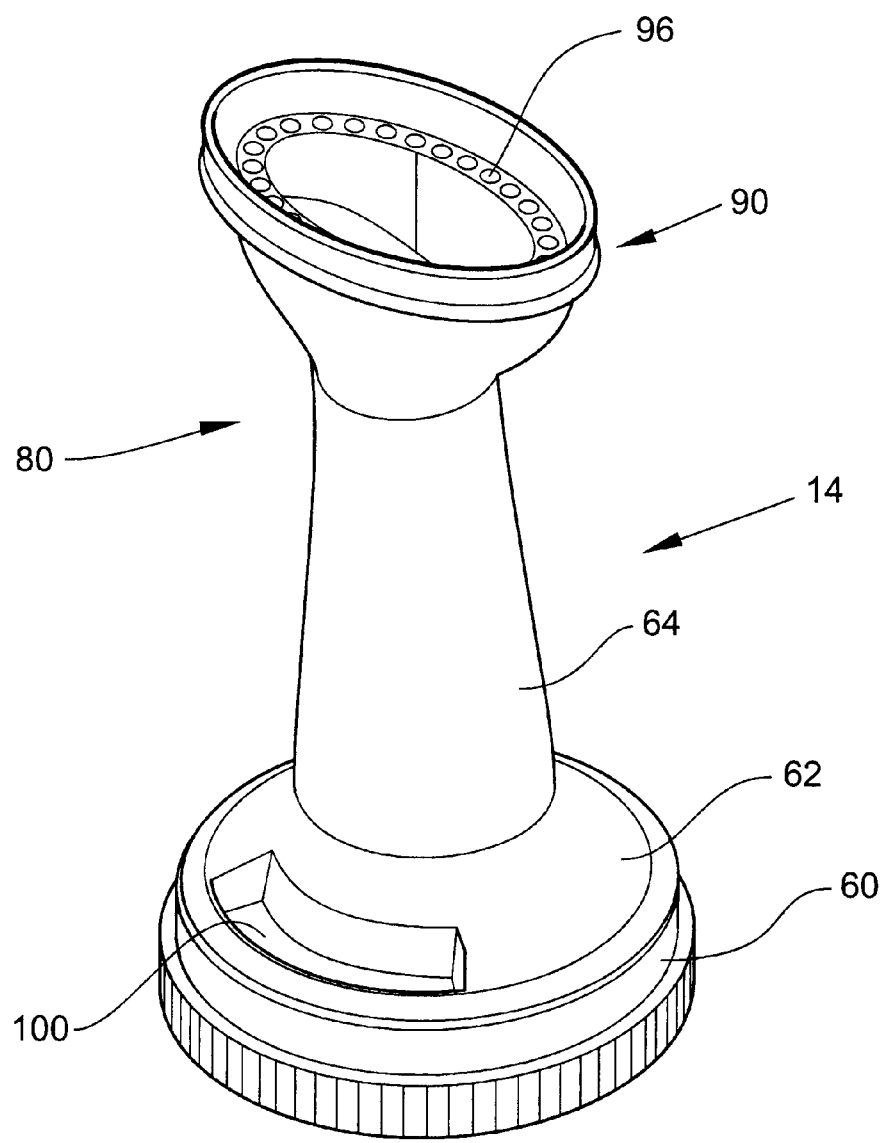
FIG. 14 is a perspective view of the brush piece according to the present invention.
Figure 15:
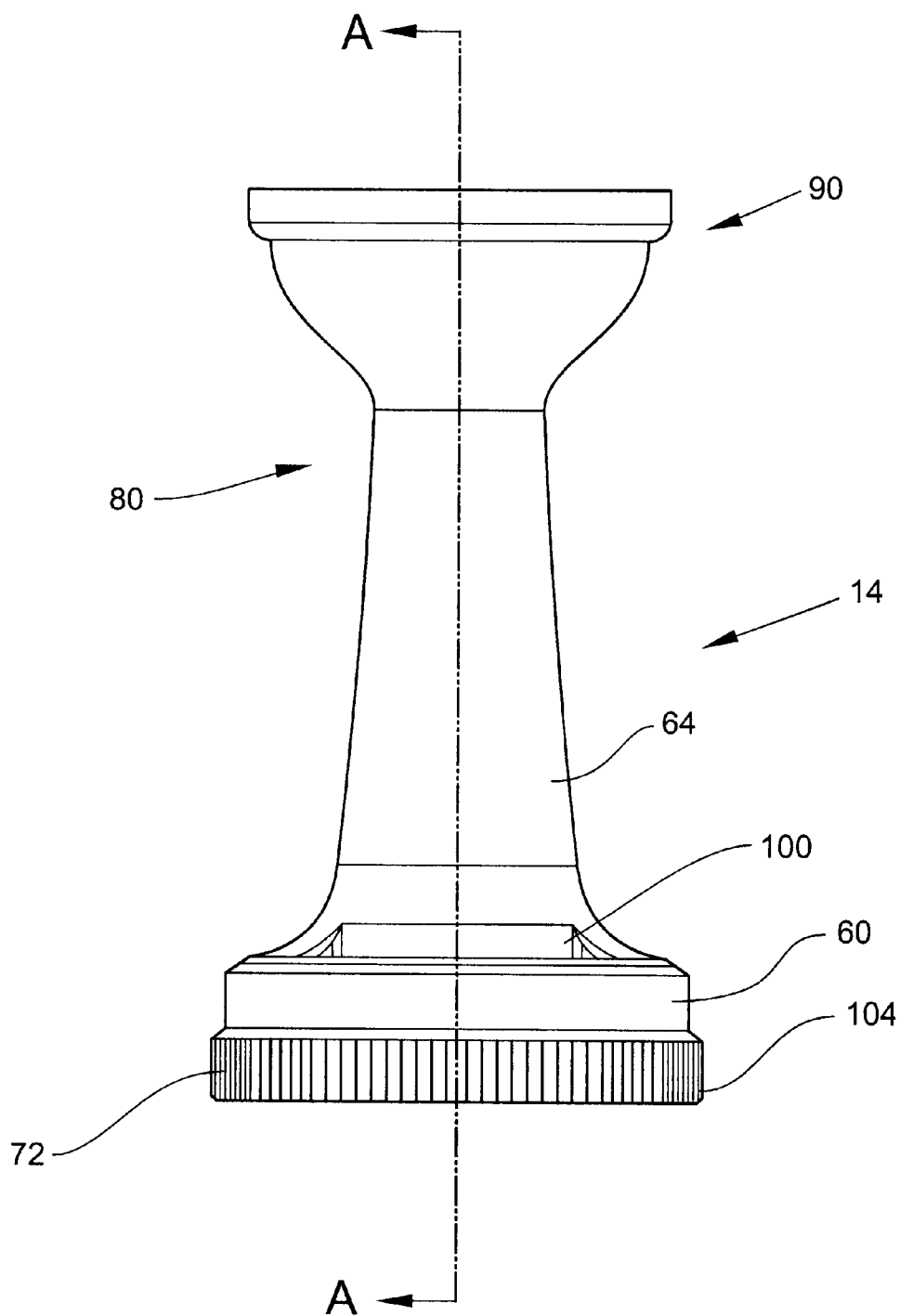
FIG. 15 is a front view of the brush piece according to the present invention.
Figure 16:
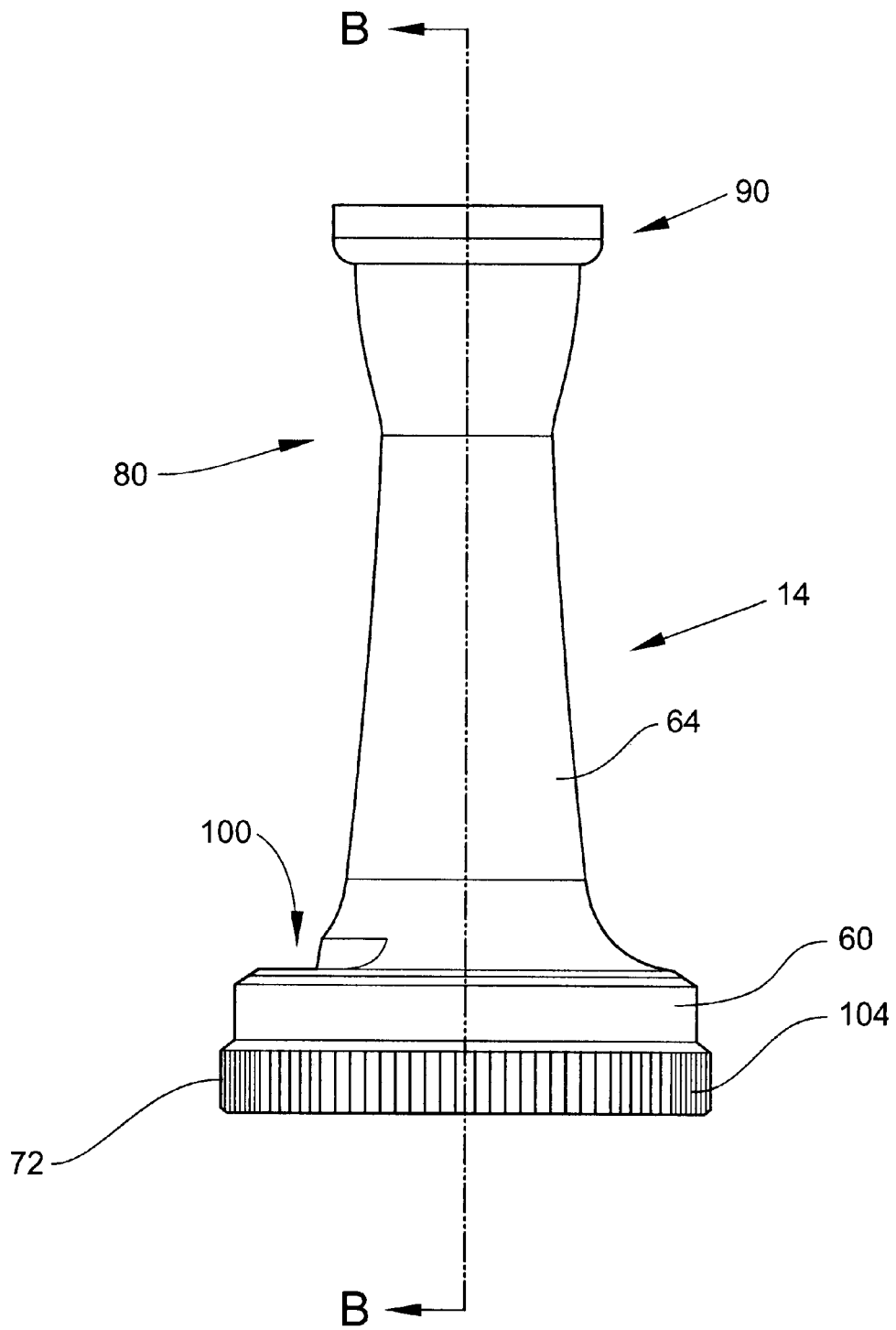
FIG. 16 is a side view of the brush piece according to the present invention.

Referring especially to FIGS. 11, 13 and 9, the fluid flow conduit 26 further comprises a top portion 42. The top portion 42 comprises a terminal ring 44 that defines an aperture 46, or opening, through which fluid may exit the cap piece 12. Located immediately adjacent to the aperture 46 are more two or more flow control tabs 48. In a preferred embodiment, there are two flow control tabs 48, however more than two may be used and still fall within the scope of the present invention. Preferentially, the two or more flow control tabs 48 are evenly spaced about the aperture 46 and arcuate in shape. Thus, when there are two, they are opposite each other (180°), when there are three, they form an equilateral triangle (120°), and so forth.

The top portion 42 includes a flow control channel 50, which is shown in greater detail in FIG. 13. The flow control channel 50 is defined by an interior wall 52 that is adjacent and contiguous with aperture 46. An exterior wall 56 and a bottom surface 54 that extends between the interior wall 52 and the exterior wall 56. As can be seen from FIG. 13, in a preferred embodiment, the exterior wall is wedge shaped, or tapered, to form a sharp edge 58.

Referring now to FIGS. 14–22, the brush piece 14 comprises a cylindrical portion 60 with a circular disk portion 62 that forms a top of the cylindrical portion 60. Centrally located in the circular disk portion 62 is a hollow fluid flow conduit receiving conduit 64. An inner surface 66 of the conduit 64 is sized to snuggly fit adjacent the fluid flow conduit 26 of the cap piece 12, when the cap piece 12 is attached to the brush piece 14.

Figure 17:
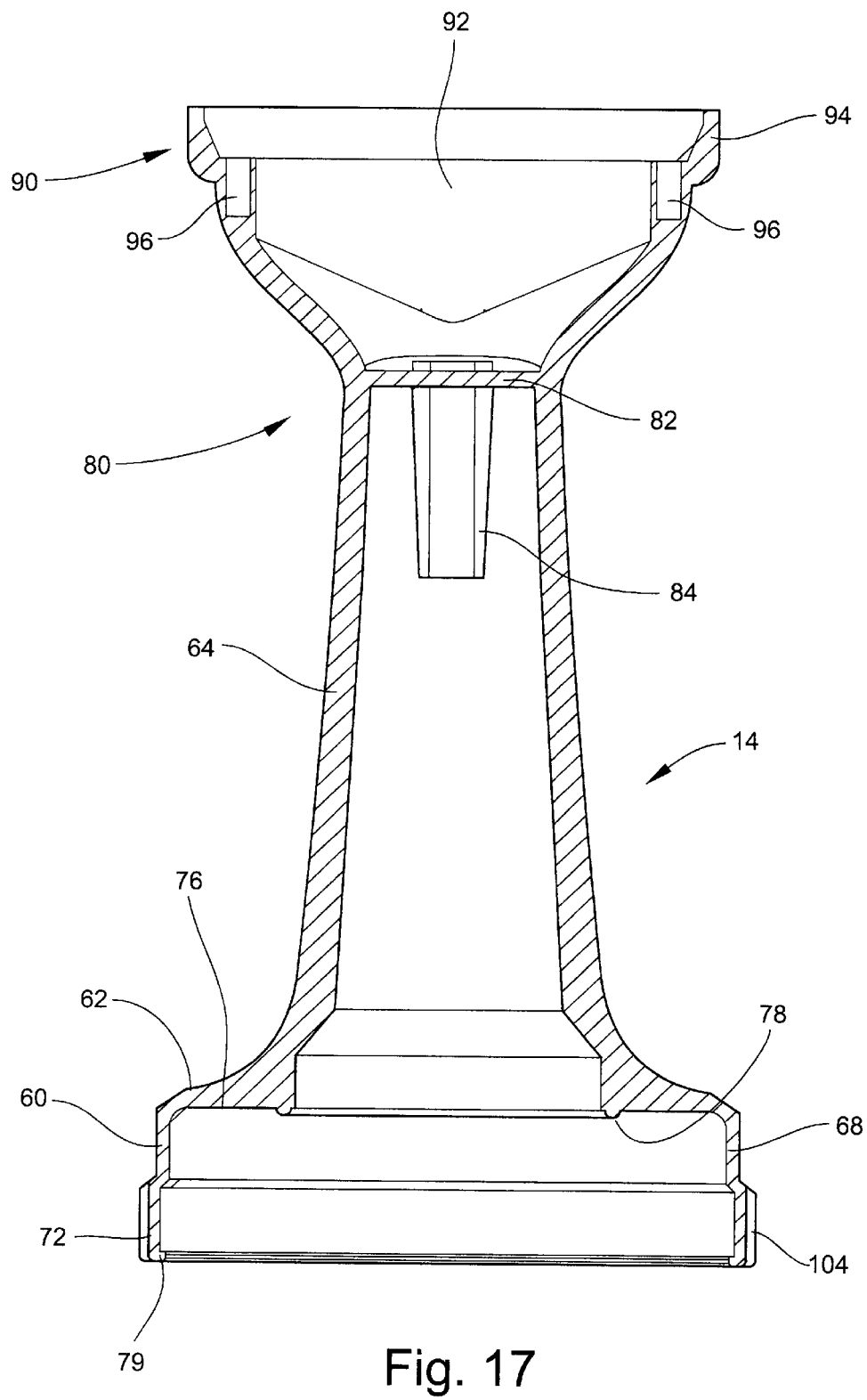
FIG. 17 is a sectional view of the brush piece according to the present invention along line B—B in FIG. 16.
Figure 18:
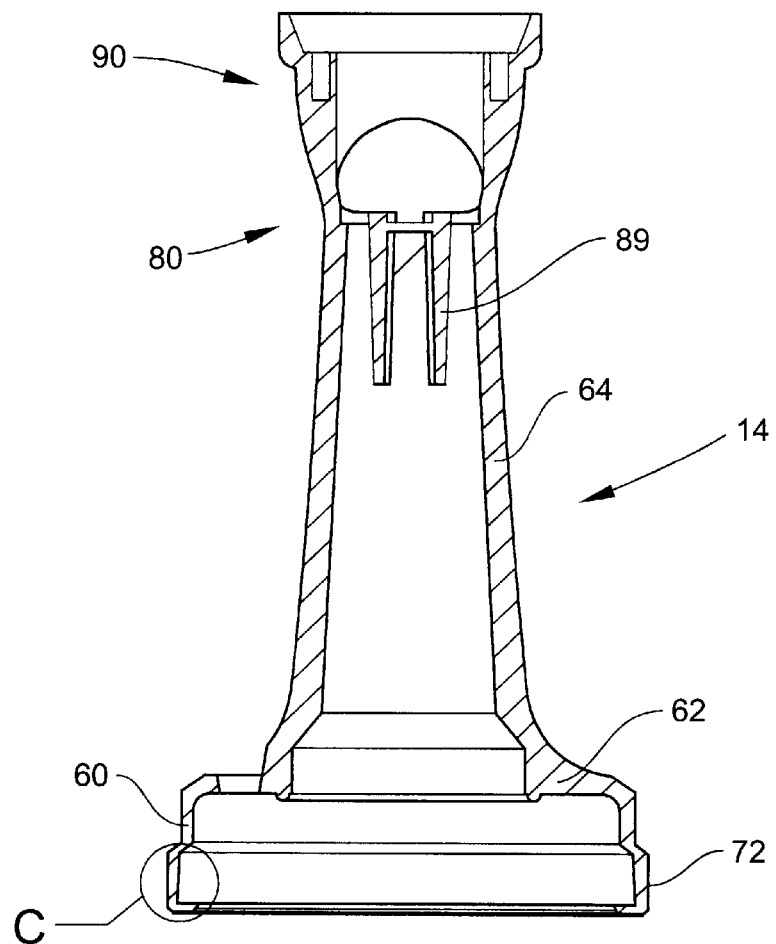
FIG. 18 is a sectional view of the brush piece according to the present invention along line A—A in FIG. 15.
Figure 19:
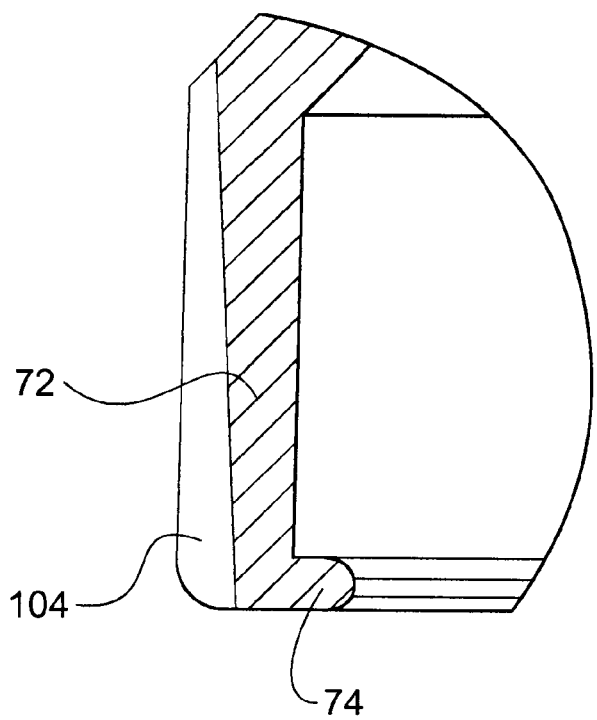
FIG. 19 is a detailed view of outlined section C in FIG. 18.
Figure 20:
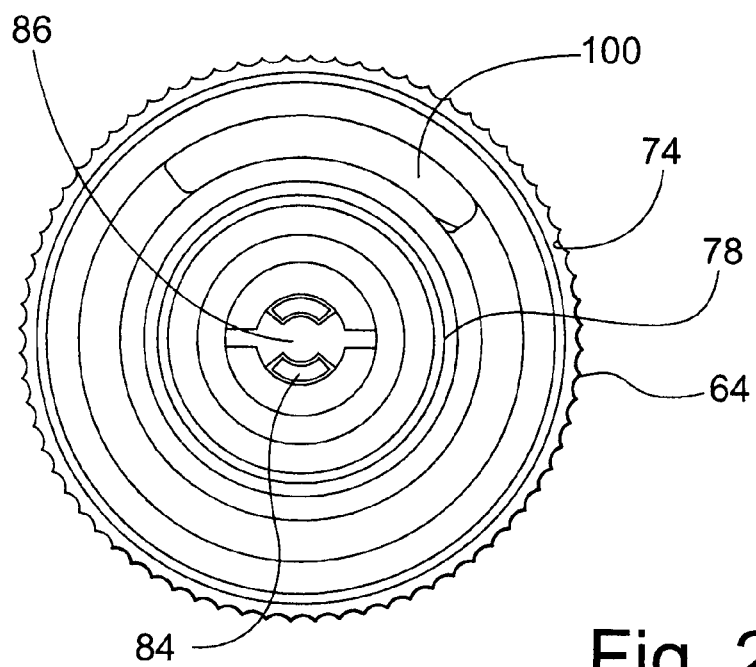
FIG. 20 is a bottom view of the brush piece according to the present invention.
Figure 21:
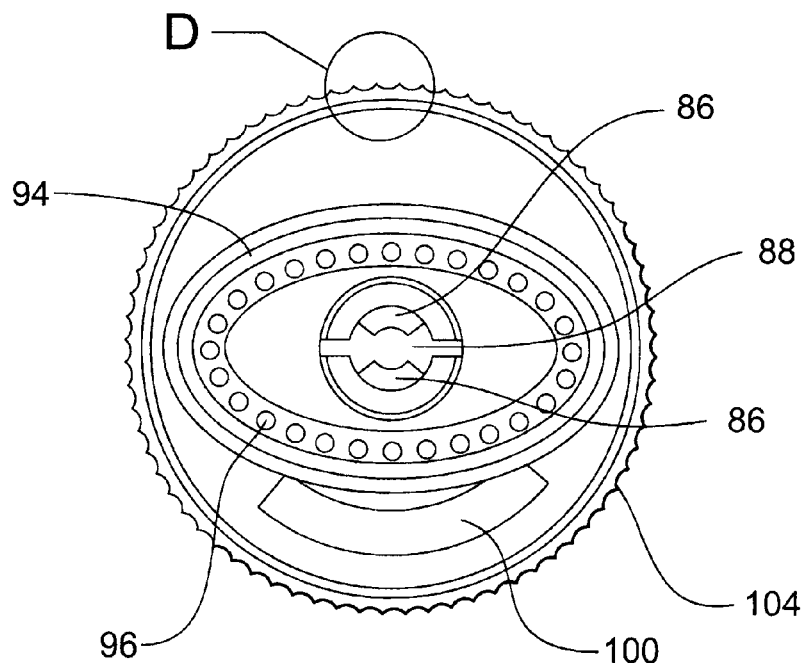
FIG. 21 is a top view of the brush piece according to the present invention.

Referring especially to FIGS. 17, 18, and 19, the interior of the cylindrical portion 60 further comprises an interior wall 68 that runs around the interior circumference of the cylindrical portion 60. Located at a distal end of the cylindrical portion 60 is a second cylindrical portion 72 that has a greater diameter than the cylindrical portion 60. Located on a distal end of the second cylindrical portion 72 is a retention ring 74 that has a diameter less than the diameter of the second cylindrical portion 72. The retention ring 74 retains the cap piece 12 when it is inserted into the brush piece 14.

Located on a bottom surface 76 of the circular disk portion 62 is a ring-shaped projection 78. The ring-shaped projection 78 is sized and located to fit within the circular channel 40 located on the circular disk portion 24, said circular channel 40 and ring-shaped portion 78 act as rotational guides for as the brush piece 14 is rotated about an axis common with the cap piece 12.

The conduit 64 further comprises a top portion 80. The top portion 80 comprises a terminal cap 82 with a flow aperture 86 located at a distal end of the conduit 64. Downwardly projecting from the terminal cap 82, and adjacent the flow aperture 86, are at least two additional flow control tabs 84. In a preferred embodiment, the number of additional flow control tabs 84 are the same as the number of flow control tabs 48. The additional flow control tabs 84 are preferably arcuate in shape and are sized and located to fit within the flow control channel 50. Further, the additional flow control tabs 84 are sized to fill the gap left between the flow control tabs 46 and provide a basically fluid seal when the additional flow control tabs 84 are in a closed position (where they fill the gap between the flow control tabs 48).

Spanning the flow aperture 86 is a flow stop 88 that effective bisects the flow aperture 86. Located on top of, or adjacent to, the flow stop 88, may be flow spreading projections, which may be arcuately, or otherwise, shaped.

Additionally, the top portion may include a brush portion 90. The brush portion 90 comprises a cup 92 with a rim 94. Inset within the rim 94 are a plurality of bristle channels 96, into which brush bristles 98 are inserted. In a preferred form, the brush portion 90 is oval in shape, however, alternate shapes, such as circular, triangular, square, rectangular, and the like, are also considered to fall within the scope of the present invention.

Figure 22:
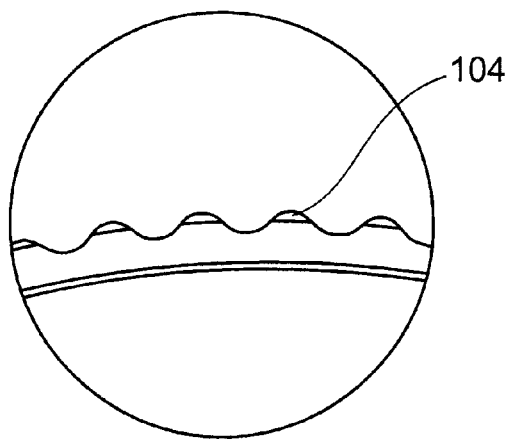
FIG. 22 is a detailed view of outlined section D in FIG. 21.

Finally, referring to the figures and especially the greater detail provided by FIG. 22, the outer surface of the second cylindrical section 72 of the brush piece 14 may further comprise texturing 104 such as knurling, wavey patterning, or the like.

In operation, and referring to FIGS. 1–5 again, when the cap piece 12 is inserted into the brush piece 14 the additional flow control tabs 84 fit within the flow control channel 50. The brush piece 14 may be rotated relative to the cap piece 12 around a common axis. There is a fully closed position where the additional flow control tabs 84 totally occlude the gaps (and the bisected aperture 86) between the flow control tabs 46. There is a fully open position where the additional flow control tabs 84 are rotated to a position behind the flow control tabs 46 thereby leaving the gaps between the flow control tabs 46 unblocked. Additionally, and importantly, the design of the present invention allows for fully variable fluid flow. This is accomplished by rotating the additional flow control tabs 84 into one of the potentially infinite intermediate positions between the fully open position and the fully closed position.

In order to facilitate reproducibility of the variable flow control, the brush piece 14 further may comprise a flow control viewing window 100 that allows the user to view flow information 102 (such as closed, lo, med, and hi) that may be provided on the top surface of the cap piece 12. Additionally, a register tab may be included on the top surface of the cap piece 12, said register tab sized to fit within the viewing window 100 and serves to limit the movement of the brush piece 14 to the angle defined by the viewing window 100. That is, the register tab is located at one side of the viewing window 100 when the device is in a closed position and at the other side of the viewing window 100 when the device is in a fully opened position.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A device for basting food products comprising a cap piece moveably fitted into a brush piece, the cap piece comprises a cylindrical portion with a circular disk portion that forms a top for the cylindrical portion of the cap piece, centrally located in the circular disk portion of the cap piece is a hollow fluid flow conduit and the cap piece includes a position retention tab that projects downwardly from a bottom surface of the circular disk portion sufficiently such that when the cap piece is attached to a fluid container, the position retention tab extends into an opening in the fluid container, thereby preventing rotation about the longitudinal axis of the cap piece, and the brush piece comprises a cylindrical portion with a circular disk portion that forms a top of the cylindrical portion of the brush piece, centrally located in the circular disk portion of the brush piece is a hollow fluid flow receiving conduit, wherein the brush piece is rotatably mounted on the cap piece to adjust the fluid flow from the fluid container.

2. A device for basting food products comprising a cap piece moveably fitted into a brush piece, said cap piece comprises a cylindrical portion with a circular disk portion that forms a top for the cylindrical portion of the cap piece, centrally located in the circular disk portion of the cap piece is a hollow fluid flow conduit, there is a position retention tab that projects downwardly from a bottom surface of the circular disk portion, the cap piece further comprises a fluid container retention cut-out having an inwardly directed retention ring located at a distal end of the cylindrical portion of the cap piece, a circularly channel located on a top surface of the circular disk portion of the cap piece and co-axial with the fluid flow conduit, said fluid flow conduit further comprising a top portion with a terminal ring that defines an aperture through which fluid may exit the cap piece, located immediately adjacent to the aperture are at least two arcuate flow control tabs evenly spaced about the aperture; the brush piece comprises a cylindrical portion with a circular disk portion that forms a top of the cylindrical portion of the brush piece, centrally located in the circular disk portion of the brush piece is a hollow fluid flow conduit receiving conduit, said brush piece further comprising a ring shaped projection that is sized and located to fit within the circular channel located on the circular disk portion of the cap piece, the fluid flow conduit receiving conduit further comprising a top portion with a terminal cap and flow apertures located at a distal end of the fluid flow conduit receiving conduit and downwardly projecting additional arcuate flow control tabs that work with the flow control tabs on the cap piece to provide variable flow capabilities to the device, said brush piece further comprising a brush portion attached to the top portion of the brush piece, said brush portion further comprising a cup with a rim and a plurality of bristles inset into channels located in the rim.

* * * * *